United States Patent Office 3,509,136
Patented Apr. 28, 1970

3,509,136
3 - [17β - HYDROXY - 7α - (LOWER ALKYL) THIO-3-OXOANDROST-4-EN-17α-YL]PROPIONIC ACID γ-LACTONES AND CONGENERS
Edward A. Brown, Wilmette, Ill., assignor to G. D. Searle & Co., Chicago, Ill., a corporation of Delaware
No Drawing. Filed July 30, 1968, Ser. No. 748,626
Int. Cl. A61k 17/16; C07c 173/00
U.S. Cl. 260—239.57   7 Claims

ABSTRACT OF THE DISCLOSURE

Preparation of the captioned compounds—for example 3-(7α-ethylsulfinyl-17β-hydroxyandrost-4-en-3 - on - 17α-yl)propionic acid γ-lactone—and their anti-inflammatory activity are disclosed.

---

This invention relates to 3-[17β-hydroxy-7α-(lower alkyl)thio-3-oxoandrost-4-en-17α - yl]propionic acid γ-lactones and congeners, and to processes for the preparation thereof. More particularly, this invention provides new, useful, and unobvious steroids of the formula

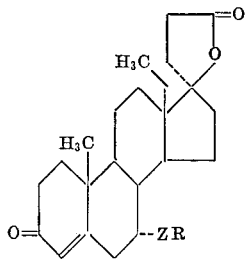

wherein Z represents thio, sulfinyl, or sulfonyl and R represents alkyl. Among the alkyls represented by R, lower alkyls are preferred, which is to say methyl, ethyl, propyl, isopropyl, butyl, isobutyl, sec.-butyl, tert.-butyl, pentyl, neopentyl, hexyl, isohexyl, heptyl, and like monovalent, saturated, acyclic, straight- or branched-chain, hydrocarbon groupings of empirical formula:

$$-C_nH_{2n+1}$$

wherein $n$ represents a positive integer less than 8.

The compounds to which this invention relates are useful by reason of their valuable biological properties. Thus, for example, the compounds are anti-inflammatory, being adapted to inhibit the edema and granuloma characteristic of the inflammatory response to tissue insult.

The anti-inflammatory utility of the instant compounds is evident from the results of a standardized test for their capacity to inhibit the formation of granuloma tissue induced in adrenalectomized rats by implanted cotton. The procedure is a modification of one described by Dulin in Proc. Soc. Exp. Biol. Med., 90, 115 (1955). Male Sprague-Dawley rats weighing 180–220 gm. are adrenalectomized, and their drinking water is thereafter replaced by aqueous 0.86% sodium chloride supplemented during the first 24 hours by glucose q.s. 5%. On the day after the adrenalectomy, 4 pellets of dental cotton weighing 5–7 mg. apiece are separately, subcutaneously, and bilaterally implanted in the pectoral and dorsal lateral neck region of each animal, whereupon the prescribed dose (initially, 20 mg. intragastrically) of compound to be tested, dissolved or suspended in a vehicle consisting of 0.5 ml. of either corn oil or a mixture of 20 ml. of aqueous 0.86% sodium chloride with 1 drop of polysorbate 80, is administered intragastrically or subcutaneously to each of 3–6 animals. A like group of animals to which is identically and concurrently administered vehicle alone serves as controls. This treatment is repeated the next day. The day after that the animals are sacrified; and the pellets, with associated granuloma tissue, are dissected, dried, and weighed. A compound is considered antiinflammatory if the mean weight of granuloma tissue in the group of animals treated therewith, adjusted to compensate for variations in dissection technique, is significantly ($P \leq 0.05$) less than the corresponding weight in the control group. A total ($2 \times 0.25$ mg.) dose of 0.5 mg. of hydrocortisone, administered subcutaneously, prevents the growth of granuloma tissue in this test.

Further evidence of the anti-inflammatory utility of the instant compounds is provided by a standardized test for their capacity to inhibit the edema induced in rats by the injection of carrageenin. The procedure is a modification of one described by Winter et al., Proc. Soc. Exp. Biol. Med., 111, 544 (1962). Compound is administered subcutaneously or intragastrically—dissolved or suspended in 0.5 ml. of aqueous 0.86% sodium chloride, propylene glycol, a mixture of these vehicles, or corn oil—to each of 10 male rats weighing 100–130 gm. A like group of rats to which is identically and concurrently administered vehicle alone serves as controls. Precisely 1 hr. later, each animal is injected under the plantar surface of each hind foot with 0.1 ml. of an aqueous 1% solution of carrageenin (Marine Colloids, Inc., Type 402). A compound is considered anti-inflammatory if the average total circumference of the 2 hind feet in the group tested therewith, which is measured in arbitrary units 5 hr. after the carrageenin injection, is significantly ($p \leq 0.05$) less than the corresponding value in the control group.

Those skilled in the art will recognize that observations of activity in standardized tests for particular biological effects are fundamental to the development of valuable new drugs, both veterinary and human.

Preparation of the compounds of this invention proceeds by heating 3-(17β-hydroxyandrosta-4,6-dien-3-on-17α-yl)propionic acid γ-lactone [U.S. 2,900,383] in the presence of piperidine with an appropriate alkanethiol of the formula:

RSH wherein R is defined as before. From the resultant 7α-alkylthio compound, the corresponding alkylsulfinyl compound is obtained on prolonged contact with m-chloroperbenzoic acid in anhydrous benzene. Either the 7α-alkylthiol or the 7α-alkylsulfinyl compound, on contact with 40% peracetic acid in benzene, affords the corresponding 7α-alkylsulfonyl compound.

The following examples describe in detail compounds illustrative of the present invention and methods which have been described for the preparation thereof. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter set forth, temperatures are given in degrees centigrade and relative amounts of materials in parts by weight except as otherwise noted.

EXAMPLE 1

3-(7α-ethylthio-17β-hydroxyandrost-4-en-3-on-17α-yl) propionic acid γ-lactone

A mixture of 50 parts of 3-(17β-hydroxyandrosta-4,6-dien-3-on-17α-yl)propionic acid γ-lactone, 26 parts of piperidine, and 252 parts of ethanethiol is heated and stirred at the boiling point under reflux for 26 hours, during which a crystalline precipitate forms. Sufficient benzene is added to dissolved the precipitate, whereupon the solution is stripped of fluids by vacuum distillation. The residue, upon recrystallization from ethyl acetate, affords 3 - (7α - ethylthio - 17β - hydroxyandrost - 4 - en - 3 - on - 17α-yl)propionic acid γ-lactone which decomposes at 201°–205°. The product has the formula

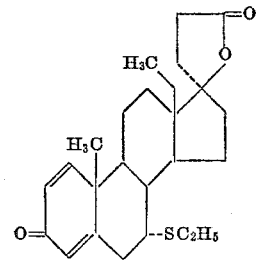

EXAMPLE 2

3-(7α-ethylsulfinyl-17β-hydroxyandrost-4-en-3-on-17α-yl)propionic acid γ-lactone To a solution of 120 parts of 3-(7α-ethylthio-17β-hydroxyandrost-4-en-3-on-17α-yl)propionic acid γ-lactone in 2250 parts of dry benzene is added 61 parts of 85% m-chloroperbenzoic acid. The resultant mixture is allowed to stand at room temperatures for 18 hours, whereupon the precipitate which forms is filtered off and the filtrate diluted with 6600 parts of hexane. The resultant precipitate is filtered off and recrystallized from aqueous acetone to give 3-(7α-ethylsulfinyl-17β-hydroxyandrost-4-en-3-on-17α-yl)propionic acid γ-lactone which decomposes at 182–190°. The product has the formula

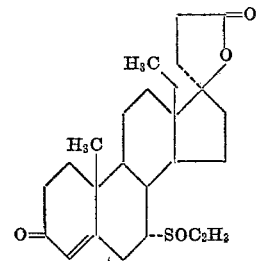

EXAMPLE 3

3-(7α-ethylsulfonyl-17β-hydroxyandrost-4-en-3-on-17α-yl)propionic acid γ-lactone To a solution of 12 parts of 3-(7α-ethylthiol-17β-hydroxyandrost-4-en-3-on-17α-yl)propionic acid γ-lactone in 225 parts of dry benzene is added approximately 10 parts of 40% peracetic acid. The resultant mixture is cooled at 5° for 2 hrs., whereupon the precipitate which forms is filtered off and recrystallized from aqueous acetone to give 3-(7α-ethylsulfonyl-17β-hydroxyandrost-4-en-3-on-17α-yl)propionic acid γ-lactone which decomposes at approximately 163–164°. The product has the formula:

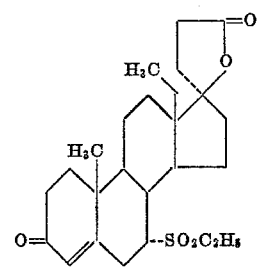

EXAMPLE 4

3-(7α-butylthio-17β-hydroxyandrost-4-en-3-on-17α-yl)propionic acid γ-lactone

A mixture of 8 parts of 3-(17β-hydroxyandrosta-4,6-dien-3-on-17α-yl)propionic acid γ-lactone, 4 parts of piperidine, and 40 parts of 1-butanethiol is heated and stirred at the boiling point for 1¾ hrs., then allowed to stand at room temperatures for 8 days. Solvent is thereupon removed by vacuum distillation, and the residue is crystallized from ethyl acetate to give 3-(7α-butylthio-17β-hydroxyandrost-4-en-3-on-17α-yl)propionic acid γ-lactone decomposing in the range 188–196°. The product has the formula

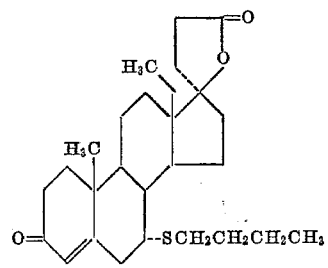

EXAMPLE 5

3-(7α-butylsulfinyl-17β-hydroxyandrost-4-en-3-on-17α-yl)propionic acid γ-lactone To a solution of 120 parts of 3-(7α-butylthiol-17β-hydroxyandrost-4-en-3-on-17α-yl)propionic acid γ-lactone in 2250 parts of dry benzene is added 57 parts of 85% m-chloroperbenzoic acid. The resultant mixture is allowed to stand at room temperatures for 4 hrs., whereupon the precipitate which forms is filtered off and combined with the precipitate formed upon addition to the filtrate of 3300 parts of hexane. The combined material is recrystallized from aqueous acetone to give 3-(7α-butylsulfinyl-(17β-hydroxyandrost-4-en-3-on-17α-yl)propionic acid γ-lactone melting in hte range 155–164°. The product has the formula:

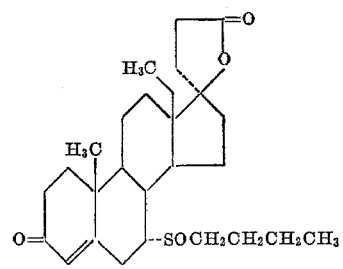

EXAMPLE 6

3-(7α-butylsulfonyl-17β-hydroxyandrost-4-en-3-on-17α-yl)propionic acid γ-lactone To a solution of 160 parts of 3-(7α-butylthiol-17β-hydroxyandrost-4-en-3-on-17α-yl)propionic acid γ-lactone in 2700 parts of dry benzene is added 92 parts of 40% peracetic acid. The resultant mixture is allowed to stand at room temperatures for 25 minutes, then chilled at 5° for 60 minutes. The precipitate which forms is thereupon filtered off and washed with approximately 350 parts of benzene. The product thus isolated is 3-(7α-butylsulfonyl-17β-hydroxyandrost-4-en-3-on-17α-yl)propionic acid γ-lactone decomposing in the range 160–172°. The product has the formula

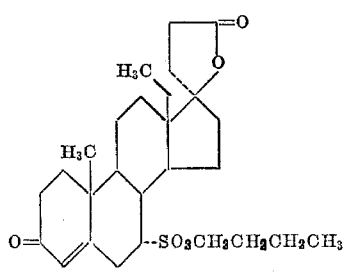

What is claimed is:
1. A compound of the formula:

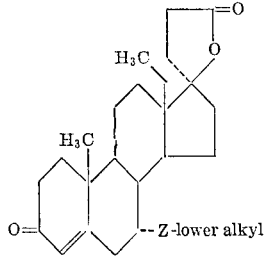

wherein Z represents thio, sulfinyl, or sulfonyl.

2. A compound according to claim 1 having the formula:

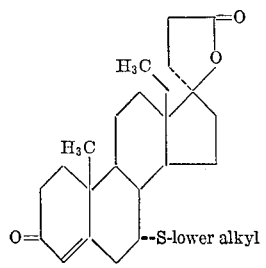

3. A compound according to claim 1 which is 3-(7α-butythiol - 17β - hydroxyandrost-4-en-3-on-17α-yl)propionic acid γ-lactone.

4. A compound according to claim 1 having the formula

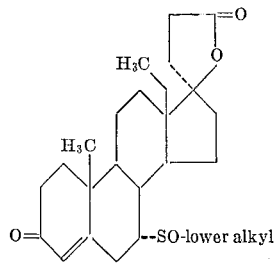

5. A compound according to claim 1 which is 3-(7α-ethylsulfinyl - 17β-hydroxyandrost-4-en-3-on-17α-yl)propionic acid γ-lactone.

6. A compound according to claim 1 having the formula

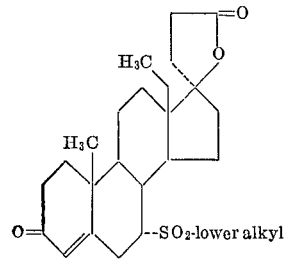

7. A compound according to claim 1 which is 3-(7α-ethylsulfonyl - 17β-hydroxyandrost-4-en-3-on-17α-yl)propionic acid γ-lactone.

References Cited
UNITED STATES PATENTS

| | | | |
|---|---|---|---|
| 3,254,074 | 5/1966 | Arth et al. | 260—239.55 |
| 3,257,390 | 6/1966 | Patchett | 260—239.55 |

LEWIS GOTTS, Primary Examiner
ETHEL G. LOVE, Assistant Examiner

U.S. Cl. X.R.
424—241

PO-1050
(5/69)

UNITED STATES PATENT OFFICE
CERTIFICATE OF CORRECTION

Patent No. __3,509,136__     Dated __April 28, 1970__

Inventor(s) __Edward A. Brown__

It is certified that error appears in the above-identified patent and that said Letters Patent are hereby corrected as shown below:

Column 1, in the formula,

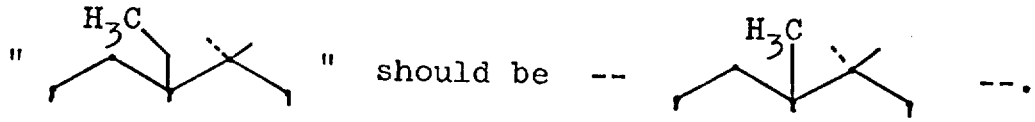

Column 3, in the first formula,

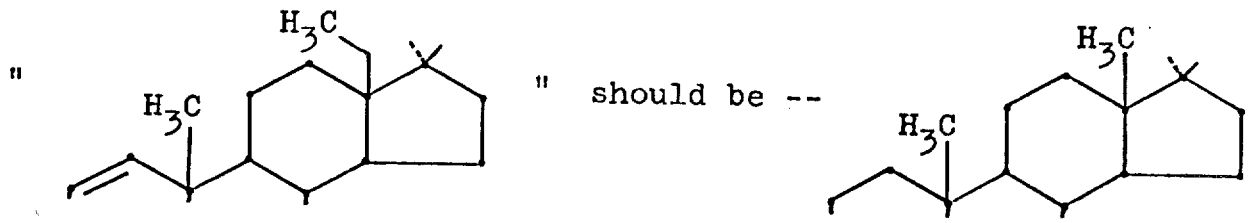

Column 3, in the second and third formulas,

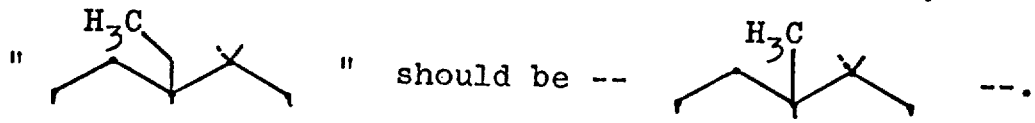

Column 4, line 33, "hte" should be -- the --; and in all three formulas in column 4,

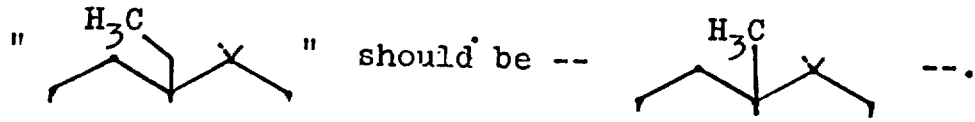

Columns 5 and 6, in all four formulas,

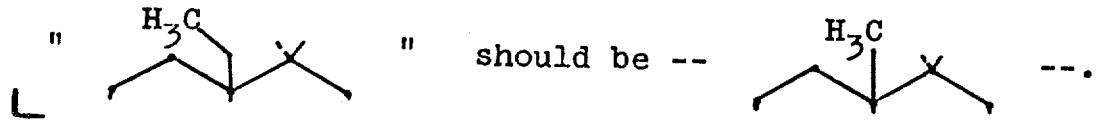

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents